United States Patent [19]

Momoi et al.

[11] Patent Number: 5,126,901
[45] Date of Patent: Jun. 30, 1992

[54] THIN FILM MAGNETIC HEAD HAVING A NARROW UPPER SURFACE

[75] Inventors: Monjiro Momoi; Kazumasa Fukuda; Mikio Matsuzaki, all of Tokyo, Japan

[73] Assignee: TDK Corporation, Tokyo, Japan

[21] Appl. No.: 533,767

[22] Filed: Jun. 6, 1990

[30] Foreign Application Priority Data

Jun. 8, 1989 [JP] Japan ............... 1-145821

[51] Int. Cl.⁵ .......... G11B 5/60; G11B 15/64; G11B 17/32; G11B 21/20
[52] U.S. Cl. ................... 360/103; 360/110; 360/108
[58] Field of Search ............... 360/103–106, 360/110

[56] References Cited

U.S. PATENT DOCUMENTS

| | | | |
|---|---|---|---|
| 3,668,668 | 6/1972 | Robitschek | 360/103 |
| 3,837,073 | 9/1974 | Case | 360/103 |
| 3,855,625 | 12/1979 | Garnier | 360/103 |
| 3,990,106 | 11/1976 | Kameyama et al. | 360/103 |
| 4,219,853 | 8/1980 | Albert et al. | 360/103 |
| 4,321,641 | 3/1982 | Lee | 360/103 |
| 4,396,965 | 8/1983 | DeMoss | 360/103 |
| 4,399,476 | 8/1983 | King | 360/103 |
| 4,473,855 | 9/1984 | Plotto et al. | 360/103 |
| 4,489,484 | 12/1984 | Lee | 360/103 |
| 4,648,087 | 3/1987 | Scranton et al. | 360/103 |
| 4,670,804 | 6/1987 | Kant et al. | 360/102 |
| 4,670,806 | 6/1987 | Cibose | 360/103 |
| 4,721,367 | 1/1988 | Yoshinaga et al. | 355/336 |
| 4,734,805 | 3/1988 | Yamada et al. | 360/104 |
| 4,761,699 | 8/1988 | Ainshe et al. | 360/103 |
| 4,789,914 | 12/1988 | Ainshe et al. | 360/104 X |
| 4,796,127 | 1/1988 | Wada et al. | 360/103 |
| 4,803,577 | 2/1988 | Ezaki et al. | 360/102 |
| 4,809,104 | 2/1989 | Kudsen et al. | 360/103 |
| 4,819,094 | 4/1989 | Oberg | 360/104 |
| 4,856,181 | 8/1989 | Pichler et al. | 360/103 X |
| 4,870,520 | 9/1989 | Shaw | 360/103 |
| 4,908,727 | 3/1990 | Ezuki et al. | 360/135 |
| 4,910,621 | 3/1990 | Matsuda et al. | 360/103 |
| 4,918,556 | 4/1990 | Ezak et al. | 360/103 X |
| 4,924,334 | 5/1990 | Diepers et al. | 360/103 X |
| 4,928,195 | 5/1990 | Ezaki et al. | 360/103 |
| 4,938,569 | 7/1990 | Tsunoda et al. | 350/339 F |
| 4,939,604 | 7/1990 | Fukuda et al. | 360/103 |
| 4,962,437 | 10/1990 | Wilcox | 360/103 |
| 5,001,583 | 3/1991 | Matsuzaki | 360/103 |

FOREIGN PATENT DOCUMENTS

| | | | |
|---|---|---|---|
| 0260152 | 3/1988 | European Pat. Off. | 357/8 |
| 0126521 | 1/1979 | Japan | 360/122 |
| 57-98120 | 6/1982 | Japan | 360/103 |
| 0210511 | 9/1986 | Japan | 360/122 |
| 0121116 | 5/1988 | Japan | 360/122 |
| 0084486 | 3/1989 | Japan | 360/110 |
| 2103714 | 4/1990 | Japan | 360/103 |

OTHER PUBLICATIONS

IBM Technical Disclosure Bulletin vol. 26 No. 6 Nov. 1983 Head Suspension Assemblies with Internal Pre-loaded Dimple, Nayak.
IBM 3370 Film Head Design and Fabrication, Feb. 1980, pp. 6–9, IBM Disk Storage Technology by R. E. Jones, Jr.

*Primary Examiner*—Aristotelis Psitos
*Assistant Examiner*—Alfonso Garcia
*Attorney, Agent, or Firm*—Oblon, Spivak, McClelland, Maier & Neustadt

[57] ABSTRACT

A thin film magnetic head consisting of a slider, and a read/write element attached to an end surface of the slider. The element is disposed between the top and bottom surfaces of the slider, on a longitudinal end surface of the slider. The top surface of the thin film magnetic head has an uppermost portion which is flat and narrower than the bottom surface.

2 Claims, 6 Drawing Sheets

5,126,901

THIN FILM MAGNETIC HEAD HAVING A NARROW UPPER SURFACE

BACKGROUND OF THE INVENTION

1. Field of the Invention

The present invention relates to a flying type thin film magnetic head provided with a reading/writing element at an end surface of a slider. More particularly, it relates to a flying type thin film magnetic head wherein only one reading/writing element is disposed in a substantially intermediate portion in the width direction of a slider.

2. Discussion of Background

There has been known, for a magnetic disk drive, a flying type thin film magnetic head which floats with a space by a minute air bearing to a magnetic recording medium by utilizing a dynamic pressure resulted when the magnetic recording medium is moved. Such flying type thin film magnetic head is disclosed in U.S. Pat. Nos. 4,130,847, 4,218,715 and 4,210,853. Namely, the basic construction of the conventional magnetic head is such that two rail portions are formed with a space therebetween at a surface of a slider made of ceramics which opposes the magnetic recording medium so that the surface between the rail portions functions as an air bearing surface, and a tapered portion is formed at each one end (at the air intake side) of the rail portions so that a lifting force is produced at the tapered portions in association with the magnetic recording medium. The reading/writing element is a thin film magnetic head element prepared in accordance with the same process as an IC manufacturing technology, and the reading/writing element is formed or attached at the air discharging side which opposes the tapered portions of the slider.

In the thin film magnetic head of this kind, there is the trend of miniaturization in order to comply with a demand of high density and high speed magnetic recording. The miniaturization of the thin film magnetic head is effective to reduce a flying height necessary for the high density recording and to reduce a spacing loss. Further, it is advantageous to increase the resonance frequency in association with a gimbal device, to eliminate crashing and to improve durability. In addition, an appropriate balance is obtainable between the dynamic pressure and the pressure of a supporting spring and the posture of the magnetic head can be properly maintained, whereby a stable flying characteristic can be obtained. Further, reduction in the mass of the magnetic head obtained by the miniaturization increases the speed of accessing movement of an arm for supporting the gimbal device.

It is, however, difficult to reduce the size of the conventional flying type thin film magnetic head because it has a complicated structure such that the rail portions and the tapered portions are provided at the surface of the slider opposing the magnetic recording medium. To solve this problem, there was proposed a thin film magnetic head, as in Japanese Unexamined Patent Publication No. 21713/1989, wherein the surface of the slider opposing the magnetic recording medium is made flat without forming the rail portions. FIG. 9 is a perspective view showing an example of the thin film magnetic head of the above-mentioned type. In FIG. 9, a reference numeral 1 designates a slider, a numeral 2 designates a reading/writing element and numerals 3, 4 designate bonding pads. The slider 1 has a medium-opposing surface 11 which is made flat without forming rail portions and tapered surfaces for producing a floating force, and the opposing surface 11 functions, as a whole, as an air bearing surface.

The reading/writing element 2 is attached to an end surface of the slider 1 which is an end in the direction of air discharging in combination of the magnetic recording medium. The reading/writing element 2 used is a single which is disposed around an intermediate portion in the width direction of the slider 1.

The bonding pads 3, 4 are connected to both ends of a conductor coil film which constitutes the reading/writing element 2.

In a case that the magnetic head shown in FIG. 9 is used in a magnetic disk drive, it is driven by a so-called contact.start.stop method wherein the surface 12 opposite the medium-opposing surface 11 is attached to a magnetic head supporting device (a gimbal device) (not shown) while the medium-opposing surface 11 is brought into to in spring-contact with the surface of the magnetic disk, and starting and stopping are carried out in this state. When the magnetic disk is in a stationary state, the medium-opposing surface 11 is pushed to the surface of the magnetic disk by the spring action of the magnetic head supporting device. However, when the magnetic disk is rotated, a dynamic pressure for floating the slider 1 to the medium-opposing surface 11 is produced, whereby a flying height obtained by balancing the dynamic pressure and the spring pressure of the magnetic head supporting device is provided.

Since the thin film magnetic head as shown in FIG. 9 is provided with the medium-opposing surface 11 in the slider 1 which is simply flat without rail portions, it is possible to reduce the size of the magnetic head to thereby assure the above-mentioned advantage.

However, the thin film magnetic head as shown in FIG. 9 had the following problems.

(a) Since the conventional magnetic head is generally of a cubic form as a whole, the reduction in the surface area of the medium-opposing surface causes the reduction in the surface area of the surface 12 opposite the medium-opposing surface 11. Since the surface 12 constitutes a part to which the magnetic head supporting device is attached, the surface area for attaching the magnetic head supporting device is reduced. Therefore, an attempt to reduce the size of the magnetic head results in difficulty in assuring a surface area necessary for attaching the magnetic head supporting device.

(b) A recess may be produced at an intermediate portion in the width direction of the medium-opposing surface 11 due to the deformation of a workpiece during machining operations to produce the slider, as illustrated in FIG. 10 with a greater exaggeration. When such recess is produced in the medium-opposing surface 11, a proper contact of the magnetic head to the magnetic disk can not be obtained, whereby a spacing loss becomes large and head-crashing may be easily caused. The durability of the magnetic head is also reduced.

SUMMARY OF THE INVENTION

It is an object of the present invention to provide a thin film magnetic head which compensates an uneven surface such as a recess in the medium-opposing surface; reduces the surface area which functions as an air bearing surface of the slider without reducing the surface area of the surface opposite the medium-opposing surface, and is effective to high density recording, rapid accessing, the elimination of crashing, improving the durability and the floating characteristic.

The foregoing and other objects of the present invention have been attained by providing a thin film magnetic head which comprises a slider, and a reading/writing element attached to an end surface of said slider, wherein said reading/writing element is disposed at an intermediate portion in the width direction of the end surface in the longitudinal direction of said slider when said longitudinal direction and said width direction are determined on the surface opposing a magnetic recording medium, of said slider, and wherein said opposing surface of the slider has the highest portion in the intermediate part in the width direction and planes gradually decreasing toward both ends in the width direction of the slider.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
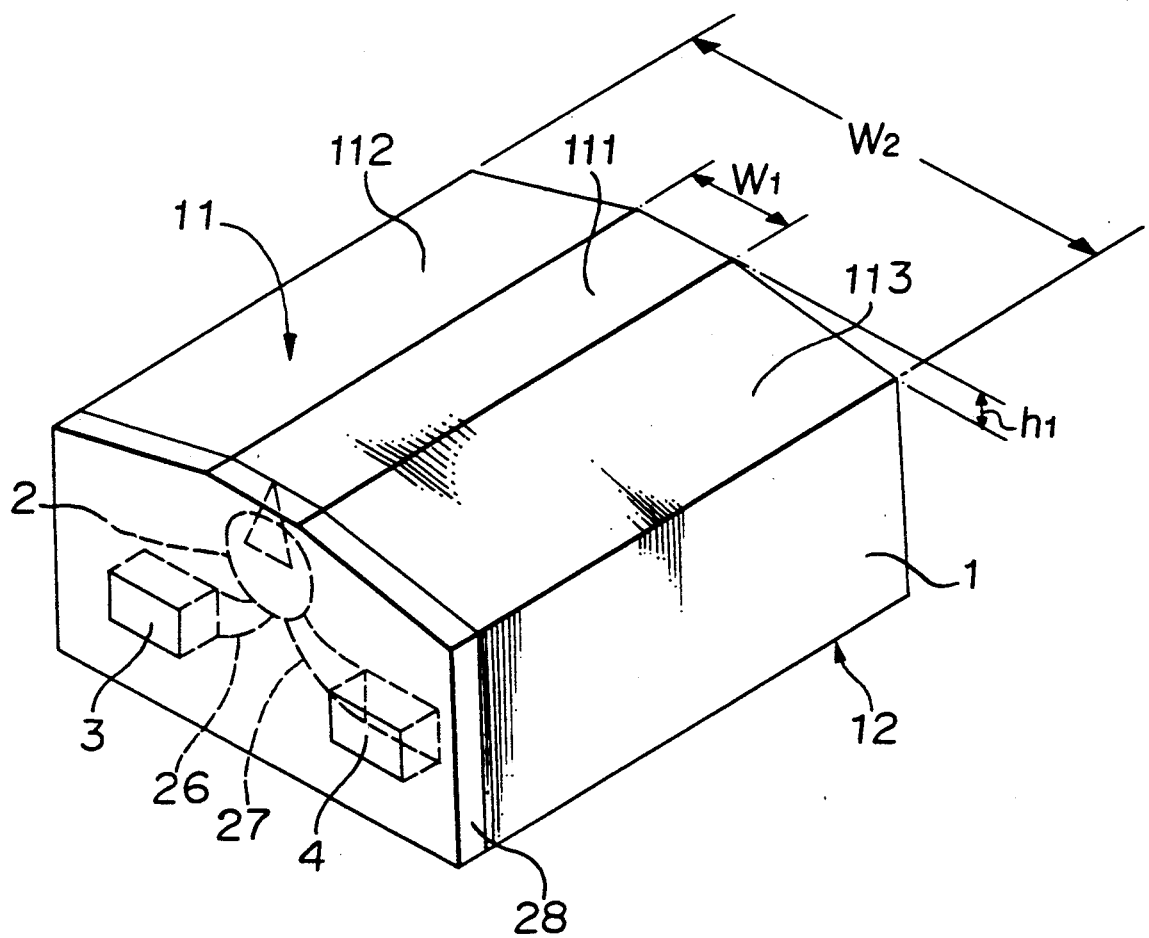
FIG. 1 is a perspective view of an embodiment of the thin film magnetic head according to the present invention.

Referring to the drawings wherein the same reference numerals designate the same or corresponding parts, and more particularly to FIG. 1, there is shown a typical example of an embodiment of the thin film magnetic head according to the present invention.

In FIG. 1, a single reading/writing element 2 is disposed in an intermediate portion in the width direction of the medium-opposing surface 11 of a slider 1 at its one end in the longitudinal direction of the slider when the longitudinal direction and the width direction are determined on the medium-opposing surface of the slider 1.

The medium-opposing surface 11 of the slider 1 has the highest portion at the middle portion in the width direction of the slider 1 at an end of which the reading/writing element 2 is located, and both side portions gradually lowering toward both side edge portions.

In the embodiment as shown in FIG. 1, the intermediate portion in the width direction of the medium-opposing surface 11 has a width w1 and extends in the longitudinal direction as a flat plane 111. At both sides of the flat plane 111, there are formed flat slanting planes 112, 113 which slantingly lower toward the both edges in the width direction of the medium-opposing surface 11. The slanting planes 112, 113 are so formed that the height h1 from the edge of the slider 1 to the flat plane 111 is 0.03 μm or more.

In the medium-opposing surface 11 of the slider 1, the flat plane 111 at the intermediate portion constitutes substantially an air bearing surface, and magnetic recording and reproducing are conducted between the reading/writing element 2 located at an end in the longitudinal direction of the air bearing surface and the magnetic recording medium.

Since the width w1 of the flat plane 111 which substantially constitutes the air bearing surface is narrow in comparison with the entire width w2 of the medium-opposing surface 11, the surface area of the air bearing surface is reduced. Accordingly, a thin film magnetic head providing a low flying height, reducing a spacing loss and suitable for high density recording is obtainable.

During the machining of a workpiece to manufacture the slider 1, a recess may result in the medium-opposing surface 11 of the slider 1. However, even though such recess is produced, it can be regulated by the slanting planes 112, 113. Accordingly, a thin film magnetic head providing a proper contact of the head to the magnetic recording medium, reducing a spacing loss, minimizing head crashing and having high durability can be obtained.

Further, the surface 12 opposing the medium-opposing surface 11 of the slider 1 has a surface area corresponding to the entire width w2 of the slider 1 without suffering influence of the reduction in the surface area of the air bearing surface. Accordingly, it is possible to assure a sufficient surface area to bond the magnetic head supporting device and a bonding strength.

It is desirable that both edges in the longitudinal direction of the flat plane 111 constituting the air bearing surface, i.e. the air discharging end and the air in-flowing end are formed in an accurate shape in order to eliminate the dragging of the magnetic head to the magnetic disk at the contact starting time.

The reading/writing element 2 is a thin film magnetic head element prepared in accordance with the same process as an IC manufacturing technology.

Figure 2:
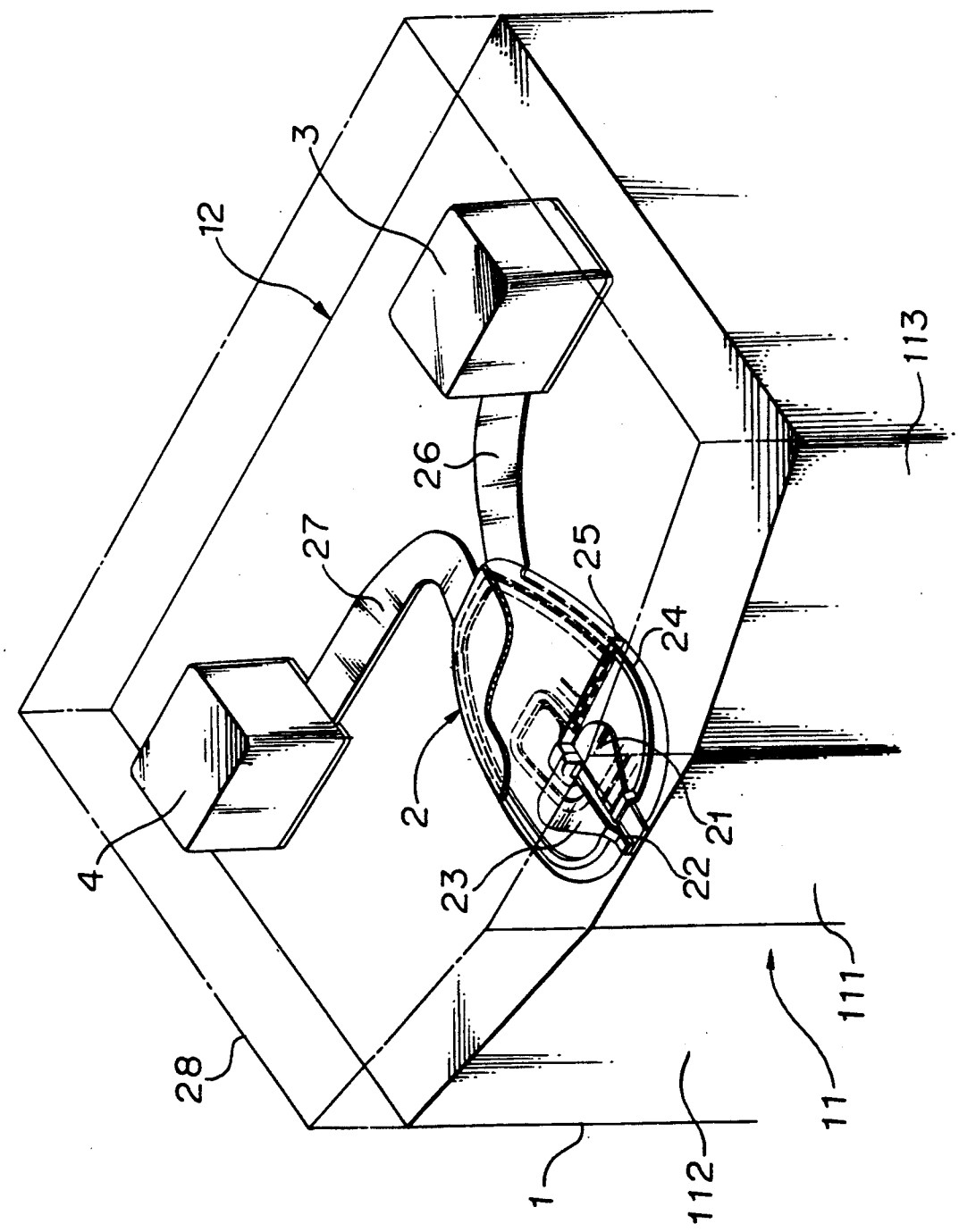
FIG. 2 is a perspective view partly omitted of an embodiment of the thin film magnetic head in which an arrangement of a reading/writing element and bonding pads is illustrated in detail.
Figure 3:
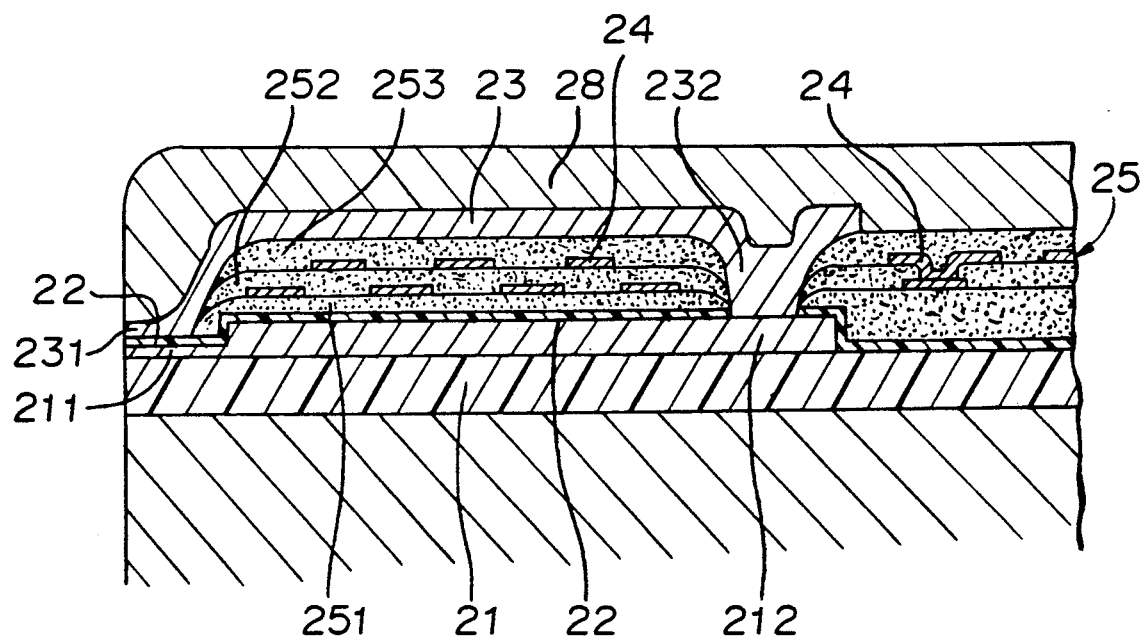
FIG. 3 is an enlarged longitudinal cross-sectional view of the reading/writing element.

FIG. 2 is an enlarged perspective view partly omitted of an embodiment of the reading/writing element, and FIG. 3 is an enlarged longitudinal cross-sectional view partly omitted of the reading/writing element 2. In FIGS. 2 and 3, a reference numeral 21 designates a lower magnetic film, a numeral 22 designates a gap film made of a material such as alumina, a numeral 23 designates an upper magnetic film, numerals 24 designate conductor coil films, a numeral 25 designates an insulating film made of an organic resinous material such as novolak resin, numerals 26 and 27 designate lead electrodes, and a numeral 28 designates a protective film.

End portions of the lower and upper magnetic films 21, 23 constitute pole sections 211, 231 which oppose interposing the gap film 22 having a small thickness so that the pole sections perform reading and writing function. Numerals 212, 232 designate yoke portions which are opposite the pole sections 211, 231 to connect the lower and upper magnetic films 21, 23 together.

The insulating film 25 is constituted by a plurality of layers of insulating films 251-253. The conductor coil films are formed on the insulating films 251, 252 so that the conductor coil films 24 surround around the connecting portion by the yoke portions 212, 232 in a spiral form.

The lead electrodes 26, 27 have their ends connected to both ends of the conductor coil films 24 and other ends connected to the bonding pads 3, 4.

FIGS. 4 through FIGS. 8 show separate embodiments of the thin film magnetic head according to the present invention.

Figure 4:
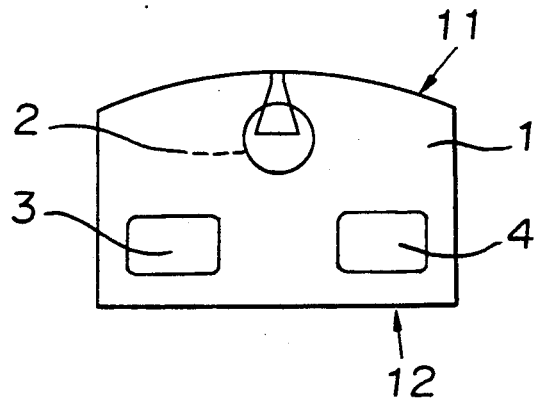
FIGS. 4 through 6 are respectively front views of other embodiments of the thin film magnetic head of the present invention.

In the embodiment as shown in FIG. 4, the medium-opposing surface 11 of the slider 1 has a curved surface in its entire region in the width direction of the slider 1 wherein the intermediate portion in the width direction of the slider 1 is the highest and the height of the slider is gradually reduced toward both edges in the width direction.

Figure 5:
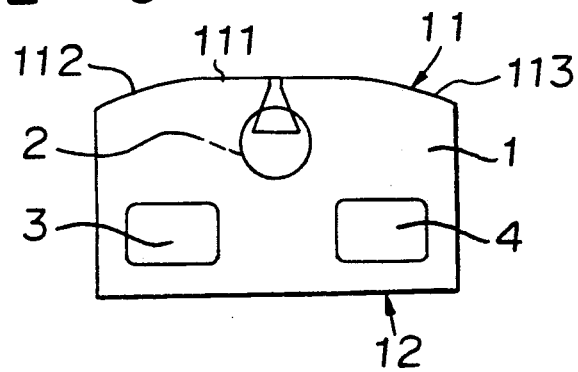

In the embodiment as shown in FIG. 5, the medium-opposing surface 11 has at its intermediate portion in the width direction a flat plane 111, and curved planes 112, 113 which extend from both sides of the flat plane 111 so as to gradually fall toward both edges in the width direction of the slider 1.

Figure 6:
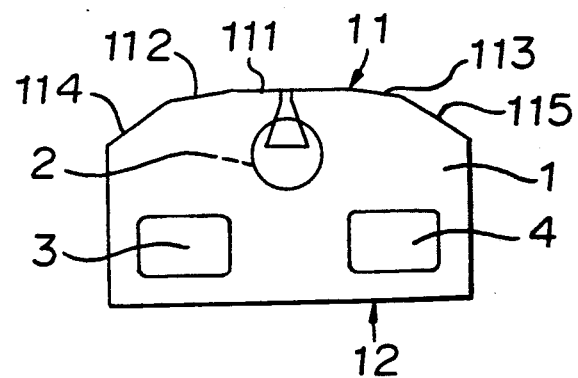

In the embodiment as shown in FIG. 6, the medium-opposing surface 11 has a flat plane 111 at its intermediate portion in the width direction, and a plurality of slanting planes 112, 113, 114, 115, so as to decrease, in a form of polygonal line, toward both edges in the width direction of the slider 1.

Figure 7:
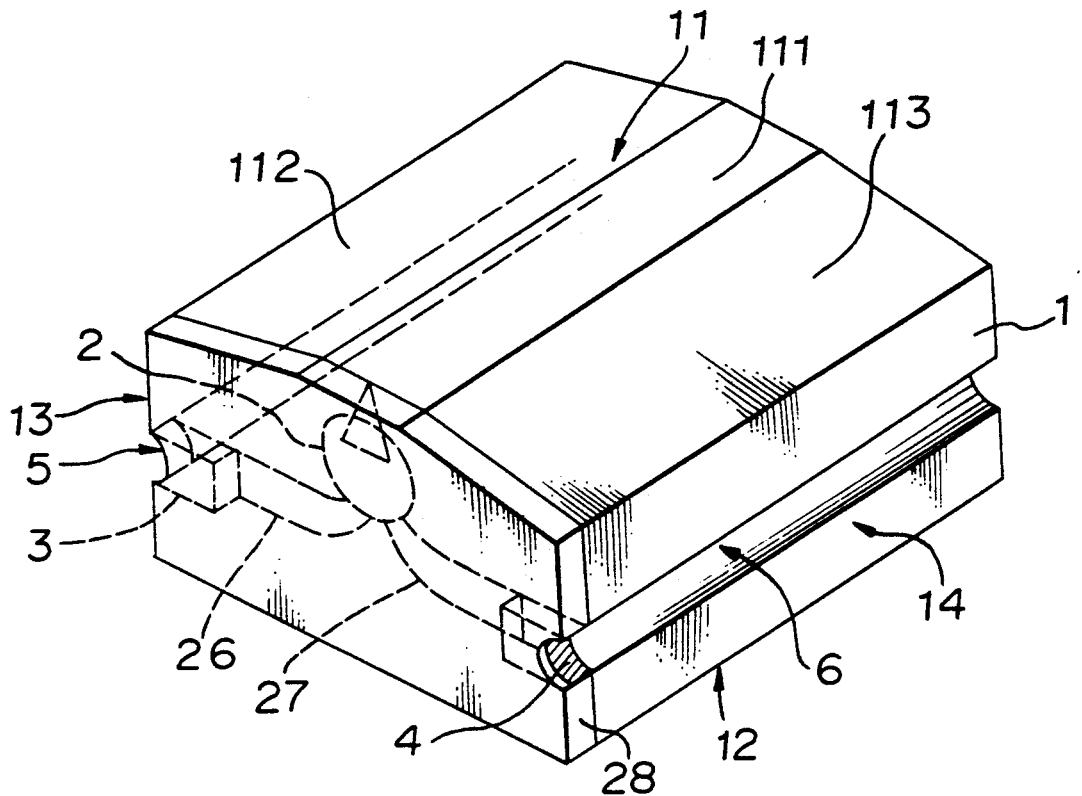
FIGS. 7 and 8 are respectively perspective views of other embodiments of the thin film magnetic head of the present invention.

In the embodiment as shown in FIG. 7, the bonding pads 3, 4 are exposed at both side end surfaces 13, 14 in the width direction of the slider 1 which are different from the end surface in the longitudinal direction of the slider where the reading/writing element 2 is provided. With such construction, the width of the end surface where the reading/writing element 2 is attached can be reduced to thereby reduce the surface area of the end surface, whereby the entire size of the thin film magnetic head can be made small. Further, a grinding operation of the surface of the protective film 28 so as to expose the bonding pads 3, 4 to which lead wires are to be bonded, is unnecessary, and therefore manufacturing steps can be simplified.

Grooves 5, 6 are formed at the both side end surfaces 13, 14 in a stripe form in the entire length of the slider so that the grooves 5, 6 are connected to the bonding pads 3, 4. The grooves 5, 6 are to receive lead wires or supporting arms introduced from a head supporting device and have a shape corresponding to the lead wired or the supporting arms to be connected. In this embodiment, the shape of the grooves 5, 6 is a semi-circular form in consideration that lead wires having a circular form in cross-section are connected to the bonding pads. By forming the above-mentioned grooves 5, 6, the lead wires or supporting arms to be introduced to the magnetic disk device can be certainly connected to the bonding pads 3, 4 even when the size of the magnetic head is reduced.

Figure 8:
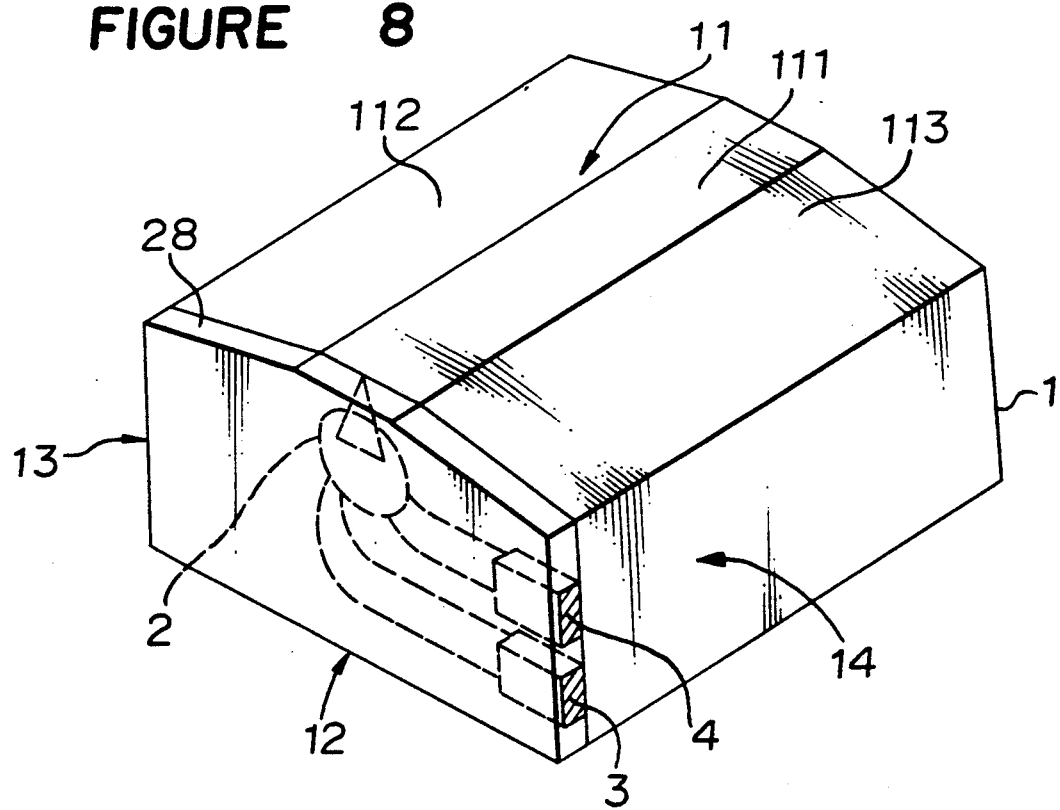
Figure 9:
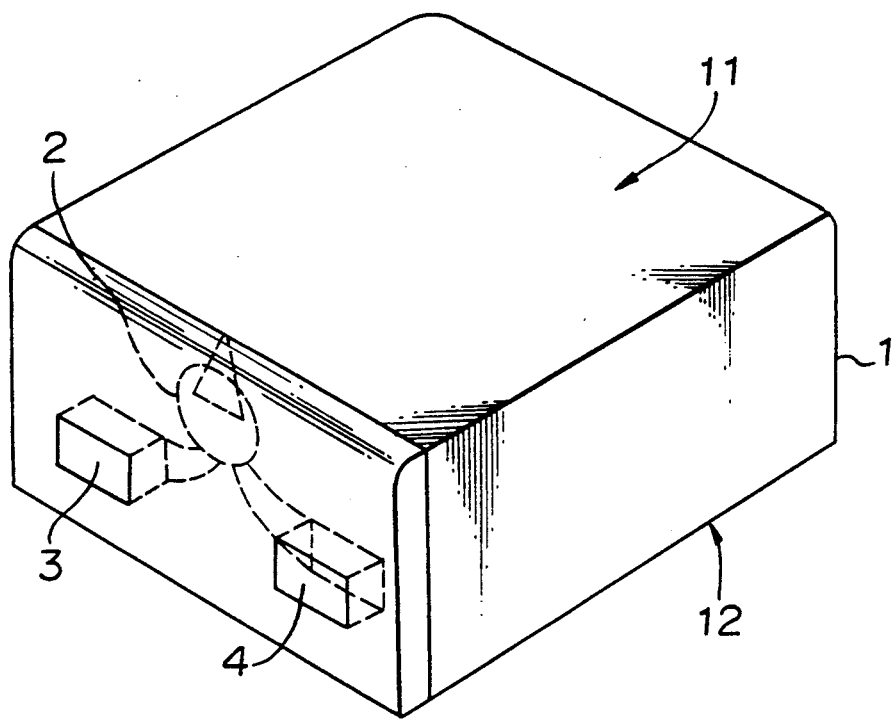
FIG. 9 is a perspective view of a conventional thin film magnetic head.
Figure 10:
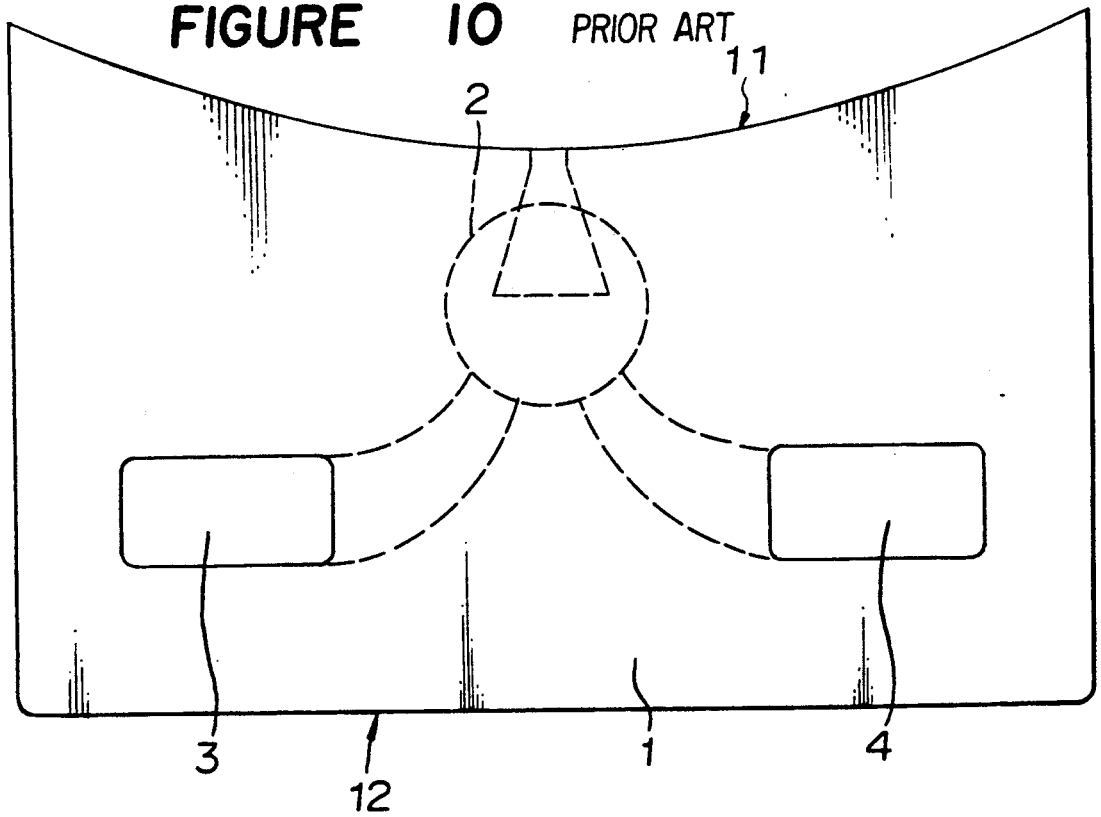
FIG. 10 is a diagram for illustrating a problem resulted in the conventional thin film magnetic head.

In the embodiment as shown in FIG. 8, The bonding pads 3, 4 are introduced to one side end surface of the slider 1. In the case of this embodiment, the width of the end surface where the reading/writing element 2 is attached, is reduced to thereby reduce the surface area, whereby the entire size of the thin film magnetic head can be reduced, and the grinding operation to the protective film 28 can be eliminated to thereby simplify the manufacturing process.

In the above-mentioned embodiment, explanation is made as to use of an in-plane recording and reproducing thin film magnetic head. However, the present invention is applicable to a vertical magnetic recording and reproducing thin film magnetic head. Further, the present invention is applicable to not only a two-terminal type magnetic head but also to three-terminal type magnetic head having a center tap.

Thus, in accordance with the present invention, the following effects can be obtained.

(a) Since the medium-opposing surface of the slider has the highest portion at the intermediate portion in the width direction of the slider and planes gradually decreasing toward both edges in the width direction of the slider, the surface area which functions substantially as an air bearing surface can be reduced, whereby a thin film magnetic head providing a low flying height, a small spacing loss, suitable for high density recording, increasing a resonance frequency in association with a gimbal device, eliminating crashing and improving durability is obtainable. Further, a thin film magnetic head wherein a proper balance is maintained between a dynamic pressure and the pressure of a supporting spring in a combination of the gimbal device; the posture of flying of the device can be desirably maintained; floating characteristics are stabilized and accessing movements are quickly obtainable, can be provided.

(b) Since the medium-opposing surface of the slider has the highest portion at the intermediate portion in the width direction of the slider and planes gradually decreasing toward both edges in the width direction of the slider, a recessed surface which may cause in the medium-opposing surface of the slider owing to the deformation of the slider when it is machined, can be corrected. Accordingly, a thin film magnetic head providing good head touching, reducing a spacing loss, minimizing head crashing and having high durability, can be provided.

(c) Since the surface opposite the medium-opposing surface of the slider is not influenced by the reduction of the surface area of the air bearing surface, a sufficient bonding surface for a head supporting device can be maintained, whereby a bonding strength can be improved.

Obviously, numerous modifications and variations of the present invention are possible in light of the above teachings. It is therefore to be understood that within the scope of the appended claims, the invention may be practiced otherwise than as specifically described herein.

What is claimed is:

1. A thin film magnetic head, comprising:
a slider with a single flat rectangular lower surface, and first and second longitudinal side surfaces perpendicular to said lower surface and connected thereto and parallel to one another, and a single flat uppermost surface which is higher than any other surface of said slider, connected to uppermost portions of the longitudinal side surfaces and substantially smaller than the lower surface, said uppermost surface parallel to said single flat rectangular lower surface and extending longitudinally from said first longitudinal side surface to said second longitudinal side surface and being narrower in a direction parallel to both said longitudinal side surfaces and to said lower surface, than said lower surface;

transverse side surfaces connected to said lower surface and said longitudinal side surfaces;

upper surfaces connected to said first and second longitudinal side surfaces, said transverse side surfaces and said single flat uppermost surface, lower than said uppermost surface and which slope away from said uppermost surface; and a reading/writing element attached to said first longitudinal side surface, said reading/writing element disposed below said uppermost surface and above said lower surface;

said transverse side surfaces are parallel to one another and each attached to said first and second longitudinal side surfaces, to said lower surface, and to at least one of said upper surfaces; and contact pads in a concave portion of each transverse side surface, said contact pads being electrically connected to said reading/writing element.

2. A thin film magnetic head, comprising: a slider including:

a single flat rectangular lower surface;

first and second longitudinal side surfaces perpendicular to said lower surface, connected thereto and parallel to one another;

a single flat uppermost surface which is higher than any other surface of said slider, connected to uppermost portions of the longitudinal side surfaces, substantially smaller than the lower surface, parallel to said single flat rectangular lower surface, extending longitudinally from said first longitudinal side surface to said second longitudinal side surface, and narrower in a direction parallel to both said longitudinal side surfaces and said lower surface, than said lower surface;

transverse side surfaces connected to said lower surface and said longitudinal side surfaces;

upper surfaces connected to said first and second longitudinal side surfaces, said transverse side surfaces and said single flat uppermost surface, which slope away from said uppermost surface;

a reading/writing element attached to said first longitudinal side surface having a contact pad extending to a selected transverse side surface, said reading/writing element disposed below said uppermost surface and above said lower surface; and wherein said selected transverse side surface has a concave groove therein which extends between the first and second longitudinal side surfaces and to said contact pad, so as to receive and securely hold one of lead wires and support means for supporting the magnetic head, and a portion of said contact pad is exposed in said groove.

* * * * *